(12) United States Patent
Knittel (10) Patent No.: US 6,606,280 B1
(45) Date of Patent: Aug. 12, 2003

(54) VOICE-OPERATED REMOTE CONTROL

(75) Inventor: Guenter Knittel, Mountain View, CA (US)

(73) Assignee: Hewlett-Packard Development Company, Houston, TX (US)

( * ) Notice: Subject to any disclaimer, the term of this patent is extended or adjusted under 35 U.S.C. 154(b) by 0 days.

(21) Appl. No.: 09/255,288

(22) Filed: Feb. 22, 1999

(51) Int. Cl.[7] .................................................. H04D 1/00
(52) U.S. Cl. .................... 367/198; 340/825.69; 341/176
(58) Field of Search ........................ 367/198; 381/73.1, 381/110; 340/825.69, 825.25; 341/176; 704/275, 246; 348/734

(56) References Cited

U.S. PATENT DOCUMENTS

| | | | |
|---|---|---|---|
| 4,641,292 A | * 2/1987 | Tunnell ...................... | 367/198 |
| 5,199,080 A | * 3/1993 | Kimura et al. .............. | 381/110 |
| 5,226,090 A | * 7/1993 | Kimura ...................... | 381/110 |
| 5,241,692 A | * 8/1993 | Harrison .................... | 381/110 |
| 5,247,580 A | * 9/1993 | Kimura et al. ................ | 381/43 |
| 5,255,326 A | * 10/1993 | Stevenson .................. | 381/110 |
| 5,267,323 A | * 11/1993 | Kimura ...................... | 381/110 |
| 5,335,276 A | * 8/1994 | Thompson et al. ........... | 380/21 |
| 5,465,401 A | * 11/1995 | Thompson ................... | 455/89 |
| 5,602,963 A | * 2/1997 | Bissonnette et al. ........ | 704/275 |
| 5,636,464 A | * 6/1997 | Ciluffo ........................ | 367/198 |
| 5,650,831 A | * 7/1997 | Farwell ....................... | 348/734 |
| 5,668,929 A | * 9/1997 | Foster ........................ | 367/198 |
| 5,848,163 A | * 12/1998 | Gopalakrishnan et al. .. | 704/275 |
| 6,119,088 A | * 9/2000 | Ciluffo ........................ | 704/275 |
| 6,188,985 B1 | * 2/2001 | Thrift et al. ................. | 704/275 |
| 6,204,796 B1 | * 3/2001 | Chan ....................... | 340/825.69 |

FOREIGN PATENT DOCUMENTS

| WO | WO 94/03017 | * 2/1994 | ............ H04Q/1/00 |
|---|---|---|---|
| WO | WO 94/03020 | * 2/1994 | ............ H04Q/9/00 |

* cited by examiner

*Primary Examiner*—Brian Zimmerman
(74) *Attorney, Agent, or Firm*—Marc P. Schuyler (57) ABSTRACT

This disclosure provides a voice-operated remote control intended to replace multiple entertainment system remotes, and it preferably includes two parts, a base unit and a remote (or table-top) unit. During normal operation, the base unit receives each electronic speaker driver signal from a stereo receiver or other sound source and uses speaker-specific transfer functions to generate an "audio mimic signal" which accounts for room acoustics and circuitry distortions. This signal is then subtracted from detected sound and a residual is used to detect spoken commands. In response to spoken commands, learned IR commands are transmitted by the base unit to the remote unit, which then repeats these commands, directing them toward the appropriate entertainment system. Learning of room acoustics and of IR and spoken commands are each performed in discrete modes. During a speaker learning mode, the base unit causes each speaker in turn to generate a test pattern which is measured via microphone and used to develop a speaker-specific transfer function. During a command learning mode, a user speaks each command (e.g., "TV on," "Tape Off," "louder," etc) several times into the remote unit until that spoken command is "learned" and recognizable.

21 Claims, 5 Drawing Sheets

VOICE-OPERATED REMOTE CONTROL

The present invention relates to electronic remote control devices, such as may be used to control a television, videocassette recorder or stereo component. In particular, this disclosure provides a voice-operated remote control that can be used for a wide variety of entertainment systems.

BACKGROUND

Many people today have televisions (TVs), videocassette recorders(VCRs), home theater systems, digital versatile disk (DVD) players, stereo components and other entertainment systems and, on an increasing basis, these devices are conveniently operated using remote controls (sometimes also called "remotes," "clickers" or "zappers"). These "remotes" typically use infrared light and special device codes to transmit commands to particular entertainment systems. Each remote/device pair usually uses a different device code, which prevents signals from being crossed. "Universal" remotes receive programming of multiple device codes and provide a user with many different control buttons, such that a single universal remote can often control several entertainment systems in a house or other environment, thereby replacing the need for at least some remotes.

While useful for their intended purpose, however, these modern remotes are not necessarily optimal. A remote may become lost or damaged through frequent handling, or may run out of battery power, which must be replenished from time-to-time. Typically also, a user must first locate and grasp a remote before it may be used and then aim it toward the particular entertainment system to be controlled. Modern entertainment systems also have complicated control menus, which can require special buttons not found on the universal remotes. Not infrequently, and despite availability of universal remotes, a person may need three or more remotes for complete control of multiple home entertainment systems, particularly where devices such as cable boxes, laser disk players, DVD players and home theater systems are also involved. Even a relatively simple action, such as changing the television station, may require a sequence of interactions.

Finally, it should also be considered that the presence of complicated menus and numerous remotes increases the possibility of error and confusion, which can lead to user dissatisfaction.

What is needed is a remote control that is easy to operate under all circumstances. Ideally, such a remote control should be user friendly, and "universal" to many different systems, notwithstanding the presence of complicated control menues. Also, such a remote control should withstand frequent use, being relatively insensitive to the wear from frequent handling that often affects handled remotes. The present invention solves these needs and provides further, related advantages.

SUMMARY OF THE INVENTION

The present invention provides a voice-operated remote control. By permitting a system to understand a user's spoken commands and reducing the requirement to frequently handle a remote, the present invention provides a remote control that is easy to use and should have significantly longer life than conventional handheld remotes. At the same time, by using spoken commands in place of buttons, the present invention potentially reduces user confusion and frustration that might result from having to search for the proper remote, or navigate a menu in a darkened entertainment room; a user "speaks," and a recognized command results in the proper electronic command being automatically effected. As can be seen, therefore, the present invention provides still additional convenience in using entertainment systems.

One form of the present invention provides a voice-operated remote control having a sound detector (such as a microphone) that detects sound. The remote also includes a memory that stores commands to be transmitted to one or more entertainments systems, a filtration module, a recognition module, and a wireless transmitter. The microphone's output is passed to the filtration module, which filters background sound such as music to more clearly detect the user's voice. The recognition module compares the user's voice with spoken command data, which can also be stored in the memory. If the spoken command is recognized, the commands are retrieved from memory and transmitted to an entertainment system.

In more particular features of the invention, the commands can be transmitted to the entertainment system through a transmitter, such as an infrared transmitter just as present-day remotes or "zappers," which also transmit in infrared. In this manner, a voice-operated remote control can be used to replace remotes that come with televisions (TVs) and other entertainment systems, e.g., the voice-operated remote control is used instead of a remote provided along with the TV or other entertainment system. The voice-operated remote can be made "universal" such that a user can program the voice-operated remote control with infrared commands and device codes for video tape recorders, DVD players, TVs, stereo components, cable boxes, etc.

More particularly, the preferred voice-operated system is embodied as two units, including a base unit and a remote (or table-top) unit. The remote unit preferably uses little power, and relays a microphone signal to the base unit that represents user speech among other "noise." The base unit is either in-line with electronic speaker signals, or is connected to receive a copy of those signals (e.g., connected to a TV to receive its audio output), and these signals are used to generate an audio mimic signal (e.g., a music signal) which is subtracted from the microphone output. The base unit thereby produces a residual used to recognize the user's spoken commands, notwithstanding the presence of a home theater system, sub-woofer, and other types of electronic speakers within a room. Upon detection of a spoken command, infrared commands can then be transmitted to the remote unit, which can have an infrared "repeater" for relaying commands back to the appropriate entertainment system or systems.

The invention may be better understood by referring to the following detailed description, which should be read in conjunction with the accompanying drawings. The detailed description of a particular preferred embodiment, set out below to enable one to build and use one particular implementation of the invention, is not intended to limit the enumerated claims, but to serve as a particular example thereof.

BRIEF DESCRIPTION OF THE DRAWINGS

FIGS. 9–10 are block diagrams of alternative processing, where two or more microphones (illustrated in the remote unit in FIG. 1) are used, to track and identify sound sources based on relative position to the remote unit.

DETAILED DESCRIPTION

The invention summarized above and defined by the enumerated claims may be better understood by referring to the following detailed description, which should be read in conjunction with the accompanying drawings. This detailed description of a particular preferred embodiment, set out below to enable one to build and use one particular implementation of the invention, is not intended to limit the enumerated claims, but to serve as a particular example thereof. The particular example set out below is the preferred specific implementation of a voice-operated remote control having two distinct components, including a base unit and a remote unit. The invention, however, may also be applied to other types of systems as well.

I. The Principal Parts

In accordance with the principles of the present invention, the preferred embodiment is a voice-operated remote control that is split into two separate boxes or "units." Voice control immediately raises the issue of noise cancellation, especially in an environment in which sound at a high volume is a wanted feature (such as is typically the case when viewing entertainment). However, in the entertainment setting, the "noise" is relatively well known, e.g., it is roughly the sound produced by the speakers and reflected by a room's interior.

Therefore, one of these two units, the "remote unit" (or "table-top unit") is preferably a small, battery-powered device that is located near a user. The primary functions of the preferred remote unit are to capture a good voice signal from the user, and also to relay infrared (IR) commands to one or more entertainment systems. [The preferred embodiment may be applied to systems that use some other communication besides IR, but since most entertainment systems use IR remotes, IR communication is preferably used.] The remote unit is preferably located close to the user, usually on a sofa table. It contains a microphone, amplification and filtering circuitry and a radio frequency (RF) transmitter. It also has an IR receiver and transmitter, collectively called the IR repeater.

The second of these boxes or units, the "base unit" (or "rack unit") is preferably connected to all speaker outlets of all amplifiers in the room or, more precisely, all speakers which contribute to the "noise." This unit will most conveniently be placed in a stereo rack or entertainment center, and it contains noise cancellation circuitry, a signal generator, a RF receiver, a speech recognition unit, a small computer and an IR receiver/transmitter pair ("transceiver"). Because this circuitry requires significantly more power than the remote unit, the base unit will preferably be a rectangular box that plugs into a conventional electrical outlet.

Notably, while the preferred embodiment uses the remote unit and base unit to respectively house circuitry for various functions, this functional allocation and two-unit arrangement are not required for implementation of the invention, and the functionality described below may be rearranged between these two units or even combined within a single housing without significantly changing the basic operating features described herein. For example, in an alternative embodiment, all communication between the remote unit and the base unit can occur by RF transmission, or by a direct electrical connection.

Figures 1, 2, 3:
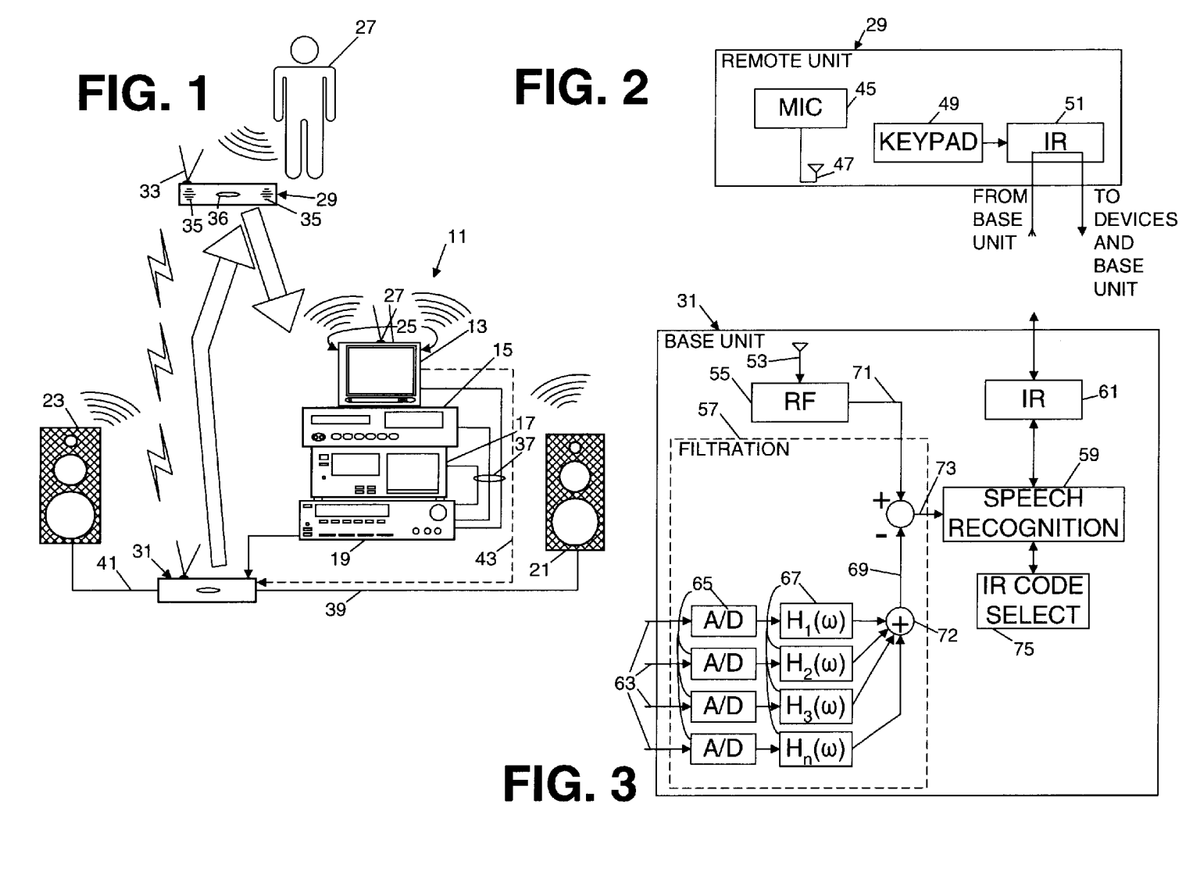
FIG. 1 shows a user, a preferred remote control, and several home entertainment systems having electronic speakers. The preferred remote control is seen in FIG. 1 to include a remote unit 29 and a base unit 31.
FIG. 2 shows a basic block diagram of the preferred remote unit from FIG. 1, and shows a microphone and radio frequency (RF) transmitter, a keypad and an infrared (IR) repeater.
FIG. 3 shows a basic block diagram of the preferred base unit from FIG. 1, including several speaker inputs, an RF receiver for receiving the microphone output from the preferred remote unit, a filtration module (indicated by phantom lines) for isolating user spoken commands, a speech recognition unit, and an infrared transmitter and receiver for issuing commands to entertainment systems; receipt of infrared commands is used in a command learning process while issued commands are preferably sent to (and repeated by) the remote unit, such that they are directed toward the appropriate entertainment system.

FIG. 1 illustrates positioning of the preferred two-unit arrangement in a hypothetical home. In particular, FIG. 1 shows an entertainment center 11 having several entertainment systems, including a television (TV) 13, a videocassette recorder (VCR) 15, a compact disk (CD) player 17 and a stereo receiver 19. The entertainment center may have many other common devices not seen in FIG. 1, such as a digital versatile disk (DVD) player, a cassette tape player, an equalizer, a laser disk player, a cable box, a satellite dish control, and other similar devices. As with many such entertainment systems, audio is produced, usually for stereo or television, and FIG. 1 shows two speaker sets, including a left channel speaker 21 and a right channel speaker 23, and a pair of TV speakers 25. Many modern day entertainment centers provide "home theater sound" and have all speakers driven by one element, often the stereo receiver 19, to produce five channels of audio output (not seen in FIG. 1) including front and back sets of left and right audio channels and a center channel. The entertainment center 11 may also include a sub-woofer (not seen in FIG. 1). [Since most user spoken commands can be detected and distinguished by considering only the spectral range of 200 Hertz–4,000 Hertz, the base unit and remote unit each filter both detected sound at the microphone and electronic speakers signals to consider this range only. Thus, sub-woofer driver signals usually do need not to be processed electronically, and will not be extensively discussed herein.]

While the preferred embodiment as further described below accepts a home theater input (e.g., five channel audio), FIG. 1 illustrates four speakers for the purpose of providing an introduction to the principal parts.

A user 27 of the entertainment center may have a multitude of remotes that have been pre-supplied with the various entertainment systems 13–19, and the preferred embodiment is a voice-operated "universal" remote control that replaces all of these pre-supplied remotes. In particular, the preferred embodiment follows the two-unit format mentioned above and includes a remote unit 29 positioned near the user, and a base unit 31 positioned near or within the entertainment center 11. The remote unit is depicted as having an antenna 33 (although the antenna will typically be within the remote unit, and not externally visible), at least one microphone (with two microphones 35 being illustrated in FIG. 1), and an infrared transmission window 36 through which the remote unit receives and sends infrared commands intended for the various entertainment systems 13–19. Importantly, only one microphone is used in the preferred embodiment, but an alternative embodiment discussed below which filters sound sources based on relative position to the remote unit might use at least two microphones.

The various entertainment systems are all depicted as having cable connections 37 between one another, partly to enable provision of sound via electronic speaker cables 39 and 41 to the left and right channel speakers 21 and 23. The base unit 31 is preferably positioned to intercept electronic speaker signals output by the stereo receiver 19, for a purpose that will be described below. In fact, it is desired for the base unit 31 to intercept all speaker signals produced by the home entertainment system and, to this effect, the audio output of the television in the hypothetical system illustrated is also coupled via a cable 43 to the base unit to provide a copy of the signals that drive the TV speakers 25. [In many home theater systems, the TV speakers will be muted, with all audio outputs being provided by the stereo receiver.]

Basic operation of the remote unit 29 is illustrated with reference to FIG. 2, which illustrates microphone circuitry 45, an antenna 47, keypad circuitry 49 for entering mode commands, audio mute and any desired numeric entries, and an IR repeater 51. The IR repeater receives keypad entries, which are transmitted via infrared to the base unit, and it also echos infrared commands intended for the home entertainment systems, which are originally generated at the base unit in the preferred embodiment.

FIG. 3 illustrates basic layout of the base unit 31, and shows an antenna 53, a RF demodulator 55, a filtration module 57, a speech recognition module 59, and an IR transceiver 61. The filtration module 57 receives a continuous radio transmission from the remote unit's microphone, and it also receives a number of speaker inputs 63, each of which is put through analog-to-digital (A/D) conversion and transformed by application of a speaker-specific transfer function; these functions are respectively designated by the numerals 65 and 67 in FIG. 3. The filtration module 57 sums these transformed speaker signals together via a summing junction 72 to yield an audio mimic signal 69. This audio mimic signal, in turn, is subtracted from information 71 representing sound received at the microphone (not seen in FIG. 3) to thereby generate a residual 73. Because the audio mimic signal represents TV and stereo sound at the summing junction, the residual 73 will represent primarily speech of the user.

The residual 73 is input to the speech recognition module 59 which processes the residual to detect user speech, to learn new user spoken commands, and to associate a detection of a known spoken command with an IR command intended for one or more of the entertainment systems (which are seen in FIG. 1). As indicated by FIG. 3, these commands are stored in an IR code selection table 75 for selective transmission using the IR transceiver 61.

Significantly, the remote unit 29 of FIG. 2, and the base unit 31 of FIG. 3, do not process all generated audio, since only user speech is of interest in the preferred embodiment. Rather, a microphone filter (not seen in FIG. 2) removes high and low audio frequencies, such that less information has to be sent via RF to the base unit. Similarly, speaker bandpass filters (not seen in FIG. 3) filter the speaker inputs to the base unit, to similarly remove unneeded high and low audio frequencies.

With the principal hardware components of the preferred embodiment thus introduced, the operation and implementation of the preferred embodiment will now be described in additional detail.

First, the preferred embodiment is designed to accept speaker inputs from a 5.1 channel system, such as defined by the 5.1 Dolby Digital Standard used by DVD recordings. The "0.1 channel" is an effects channel, usually fed into a sub-woofer and cut off sharply above circa 100 Hertz. Since this range is below the audio range of interest (e.g., the audio range for user command processing), this input is either disregarded or passed-through by the base unit. Second, the 5.1 channel amplifier is preferably the only device connected to any speaker, i.e., any built-in TV speakers are always off. Thus, the base unit is preferably configured to receive only five speaker outputs of the amplifier: left and right front speakers; a center speaker; and left and right surround speakers. For reasons explained above, the sub-woofer is not monitored. The base unit preferably also accepts a two-channel input from a conventional stereo system, in case the user does not have 5.1 channel system.

Figure 4:
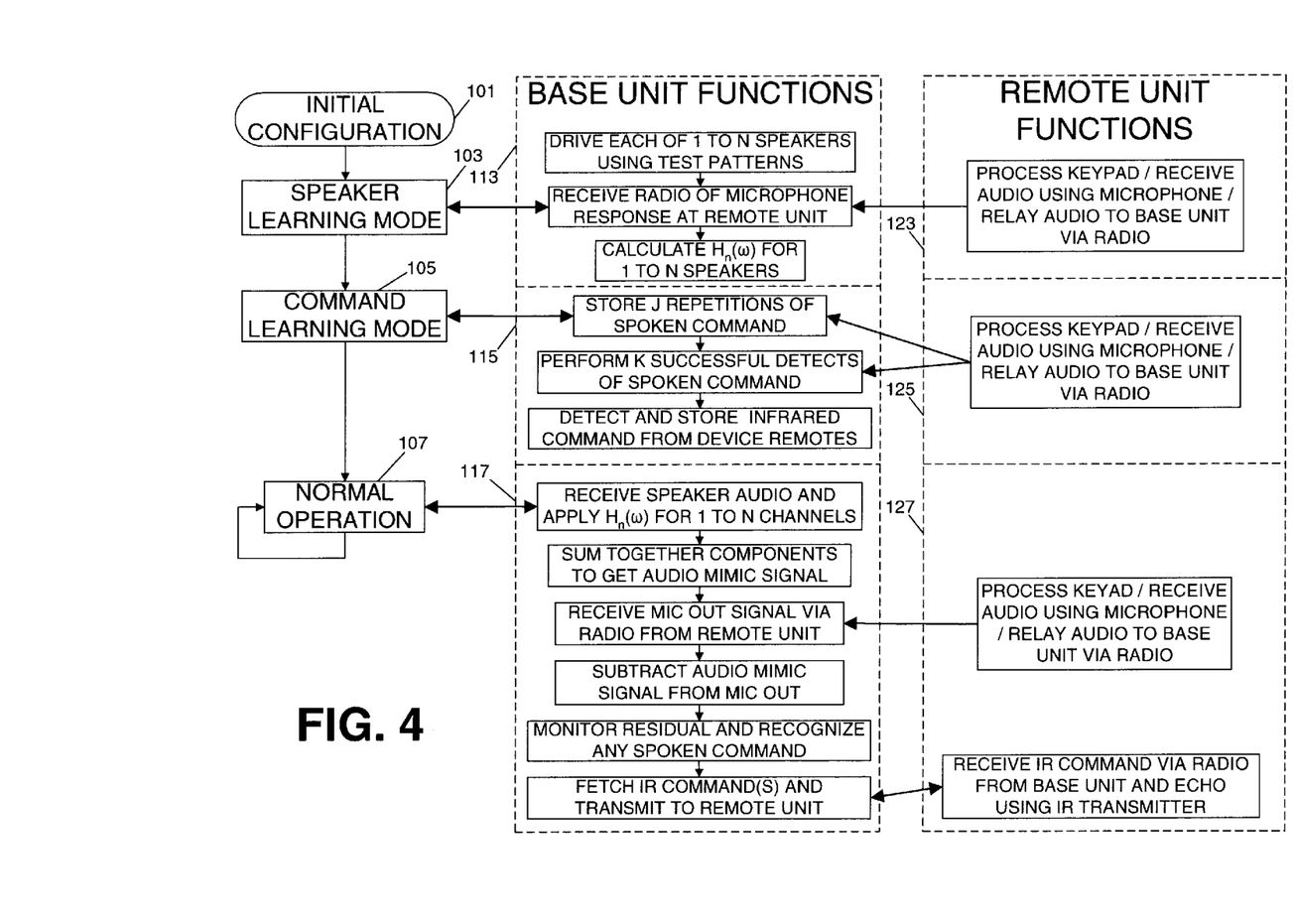
FIG. 4 is a three-part functional diagram showing in a left column several basic modes of the preferred remote control and in middle and right columns the functions performed by each of the base unit (middle column) and remote unit (far right column) while in these modes.

To function in normal operation, the preferred embodiment must first be configured to learn spoken commands, to learn IR commands that are to be associated with each spoken command, and to learn speaker configuration within a given room so as to accurately mimic audio (i.e., to generate an accurate audio mimic signal). This configuration and learning are triggered by pressing certain mode buttons found on the remote unit, which causes the preferred remote control to enter into configuration and learning modes, respectively. FIG. 4 illustrates functions performed in these modes vis-a-vis normal operation of the preferred remote control.

A left hand column of FIG. 4 shows blocks 103, 105 and 107 for the basic operating modes of the preferred device, including the speaker learning mode 103, the command learning mode 105, and normal operation 107. The purpose of the speaker learning mode is to set up a programmable processing unit for each speaker channel inside the base unit, which mimics the signal transformations by the speakers, the circuitry of the remote unit and the base unit, the delay by the air travel and the room acoustics such as echoes from walls of the room. An exact reproduction of this chain enables the base unit to remove the sound from the speakers from any other sound, i.e., spoken-commands, received by the remote unit. The purpose of the command learning mode is to enable the base unit to detect spoken commands and associate them with infrared commands for sending to the various entertainment systems.

Thus, the speaker learning from mode 103 and the command learning from mode 105 are required for use of the preferred remote control and, therefore, the preferred remote automatically enters these modes for initial configuration (represented by numeral 101) and when room acoustic information and stored user spoken commands and IR commands are otherwise not available. In addition, the speaker learning mode 103 is preferably entered whenever the room acoustic is changed permanently (e.g., new furniture, changed speaker placement), and the user is provided with a speaker learning mode button directly on the housing of the remote unit to enable re-calibration of room acoustics. As the need for re-calibration implies, the remote unit is preferably left at a fixed position within a room during regular operation. Optionally, the base unit may automatically enter the speaker learning mode 103 and the command learning mode 105 at periodic intervals, or in response to an inability to process detected user spoken commands.

A middle column of FIG. 4 indicates functions of the base unit in each of the three modes mentioned, via separate dashed-line blocks 113, 115 and 117; these blocks correspond to the speaker learning mode 103, the command learning mode 105 and normal operation 107. Each of these dashed-line blocks 113, 115 and 117 include various function blocks explaining operation of the base unit while in the corresponding mode. For example, as indicated by the top-most dashed-line block 113, during the speaker learning mode, the base unit provides a test pattern to a tuner or Dolby Digital 5.1 standard input, for purposes of testing each speaker in succession. The base unit receives detected sound from the microphone representing the speaker currently being tested as well as an electronic speaker driver signal from the stereo receiver and, using this information, the base unit calculates a transfer function $H_n(\omega)$ for each of N speakers (n=1 to N) as they are individually tested. This transfer function represents all of the room reflections and delays that produce sound in response to each speaker. These various functions of the base unit during these various modes will be further discussed below.

Finally, a third column of FIG. 4 also includes three dashed-line blocks 123, 125 and 127, which show remote unit operation during the speaker learning mode 103, the command learning mode 105 and normal operation 107. For example, during the speaker learning mode 103, the remote unit's responsibility is to receive microphone audio and relay an audio signal to the base unit via its RF transmitter. [The remote unit also filters microphone output to remove frequencies outside of 200 Hertz–4,000 Hertz, such that there is less information to be transmitted via radio].

II. Design of The Remote Unit

Figures 5, 6, 8:
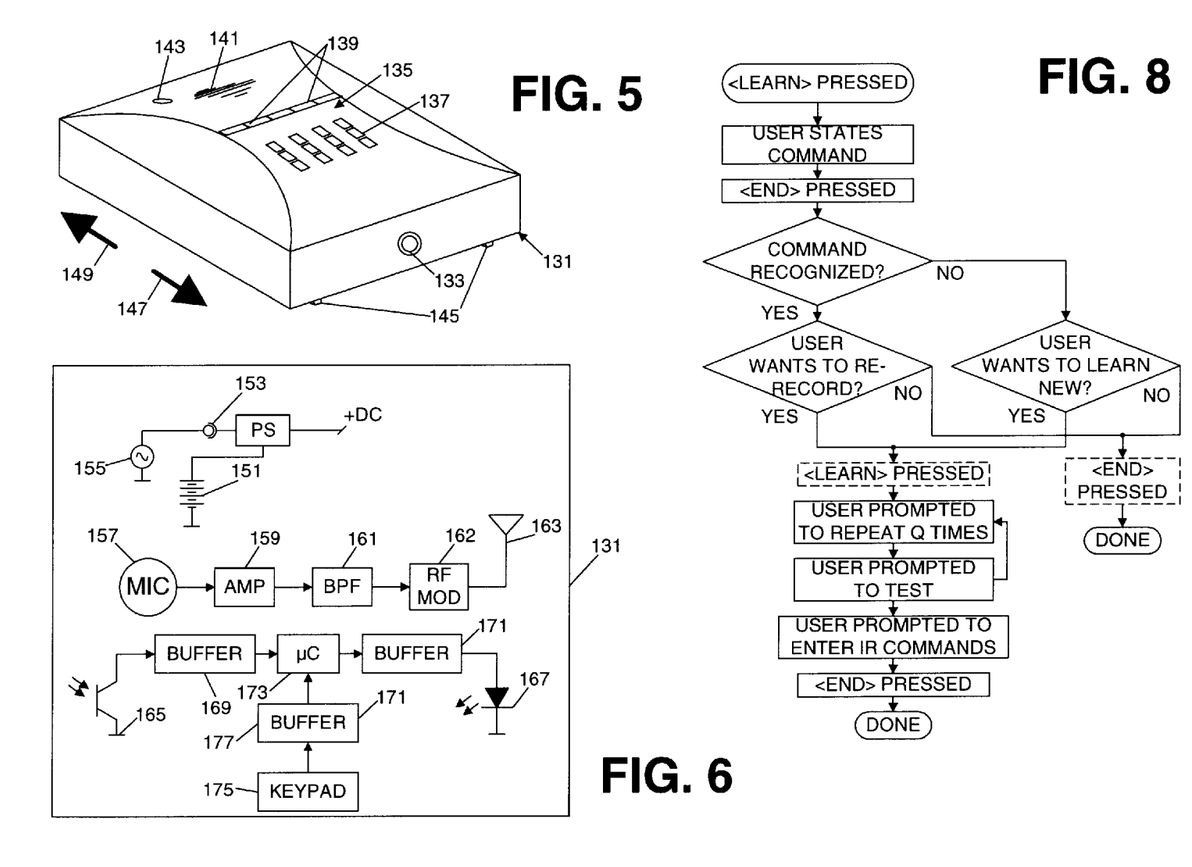
FIG. 5 is a perspective view of a remote unit, including a microphone grille, keypad and window for the IR repeater, all visible from the exterior of the remote unit; the remote unit is preferably placed in front of a user with the microphone grille facing the user, while the IR window is directed towards one or more entertainment systems and the base unit.
FIG. 6 is a detailed block diagram showing the circuitry of the preferred remote unit of FIG. 2.
FIG. 8 is a block diagram showing the process of learning to recognize user voice commands.

The design of a preferred remote unit 131 is presented using FIGS. 5 and 6. In particular, FIG. 5 shows a perspective view of the remote unit, while FIG. 6 presents a block schematic diagram of the remote unit.

As seen in FIG. 5, the remote unit 131 is somewhat similar in appearance and size to conventional remotes. It is generally rectangular in shape and includes an IR window 133 through which IR commands and data may be received and transferred. It also has a keypad 135 which may include an optional set 137 of standard numeric keys. The preferred remote unit also includes a set 139 of mode keys, a microphone grille 141 and a power-on indicator and/or a power on/off button 143. Because the remote unit 131 normally functions to transmit sound detected by the microphone to the base unit, it is desirable to turn the remote unit "off" when not in use to conserve power. [Alternatively, the remote unit or the base unit may have been designed to have an automatic sleep function, which "awakes" speech recognition circuitry when sampling detects a significant residual.] The remote unit includes a set of feet 145 which permit the remote unit to rest slightly elevated above a table-top. Preferably, the remote is positioned such that the IR transmission window 133 faces toward the base unit and entertainment systems, in the direction indicated by a reference arrow 147. Similarly, the design of the remote unit positions the microphone (not seen in FIG. 5) and the microphone grille 141 slightly inclined toward the user, who will generally be positioned in the direction indicated by another reference arrow 149.

FIG. 6 shows the internal electrical arrangement of the remote unit 131. In particular, the remote unit uses a battery 151 to generate a direct current (DC) power supply, and has an optional plug 153 for an alternating current (AC) transformer accessory 155. The DC power supply is used to drive the microphone circuitry, IR repeater and keypad circuitry. As seen in FIG. 6, the microphone circuitry includes a microphone 157, an amplifier 159 and a band pass filter 161, which removes low and high frequency components (e.g., to filter detected audio to the 200 Hertz to 4,000 Hertz range). This output is then provided to an RF modulator 162 which transmits audio which has been received at the microphone through an internal antenna 163 to the base unit. The IR repeater circuitry uses both an infrared detector 165 and an infrared transmitter 167, each having associated buffer and driver circuitry 169 and 171 respectively. That is to say, the IR detector 165 includes a buffer 169 which demodulates (received) infrared into a digital code, which is then transferred using a micro-controller 173 to the buffer and driver 171 for the IR transmitter 167. As indicated previously, during normal operation, the IR circuitry will effectively repeat received IR commands to reflect them back towards a stereo rack or entertainment center such that they may be received by the intended entertainment systems. The keypad circuitry 175 also includes a buffer and de-bounce electronics 177, which enable the micro-controller chip 173 to direct the IR transmitter 167 to send a control code command to the base unit using a device code (unique to the base unit) which is hardwired into the remote unit.

The keypad circuitry 175 preferably detects user activation of any of five different buttons; "on/off," "mute," "learn," "configure room" and "end." While "on/off" requires no significant explanation, the "mute" command is actually a command that must be learned and is a subset of the "command learning" mode which is entered upon pressing the "learn" button. The "mute" command is intended to dampen the sound level in cases the system can not recognize a spoken command.

In order to teach the base unit the "mute" command, the user first presses the "learn" button, followed by the "mute" button on the remote unit. Then, the user sequentially presses the "mute" button on each pre-supplied remote(s) that came with the entertainment systems with those remotes each pointed toward the base unit; typically, the remote that will be of most interest is the one supplied for control of a television, stereo receiver or home theater system. This use of the device-specific remote causes the base unit to memorize the audio mute command(s) for all stereo receivers or entertainment systems. Finally, the user presses the "end" button on the remote unit. Thereafter, when the user presses the "mute" button, the remote unit will send a "mute" button indicator to the base unit, which will in turn send the appropriate device-specific commands to be bounced off of the remote unit, each back toward the appropriate entertainment system.

III. Design of the Base Unit

Figure 7:
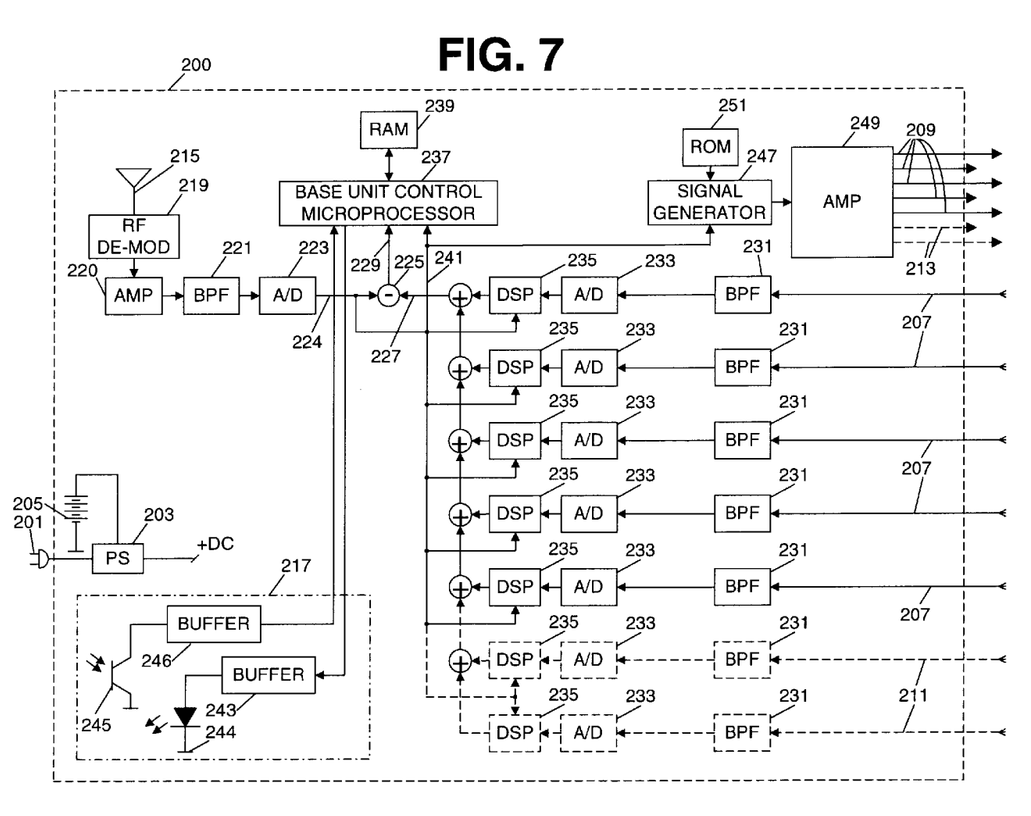
FIG. 7 is a detailed block diagram showing the circuitry of the preferred base unit of FIG. 3.

As indicated earlier, the base unit is generally a rectangular box, having an AC cord for plug-in to a conventional outlet, connections to receive electronic speaker signals and an IR transmission window for communicating with the remote unit and for learning IR commands from individual device remotes. FIG. 7 shows a block level schematic of electronic circuitry inside the base unit (depicted by reference numeral 200 in FIG. 7).

In particular, the base unit 200 receives power via a plug 201 from an electrical outlet, which is then input to a power supply 203 to generate a supply voltage. The base unit also includes a back-up battery 205 which helps enable memory retention in the event of a power failure, for such things as learned spoken and IR commands. The base unit also includes a set of five external speaker inputs 207 to the base unit from a stereo receiver or home theater system, which are provided as a copy of the signals directly sent to the stereo or home theater speakers. optionally, the base unit can include two additional inputs 211 (indicated by dashed lines) for an additional TV audio connection or other purpose. In addition to these inputs, the base unit provides a corresponding five 209 (as well as an optional two 213) channel outputs, which may be input to a stereo receiver or home theater system for use in driving the electronic speakers during the speaker learning mode. The only other signal outputs or inputs to the base unit are through an internal antenna 215 and through an infrared transceiver 217.

The antenna 215 is coupled to an RF de-modulator 219, an amplifier 220, a bandpass filter 221 and an analog-to-digital (A/D) converter 223 for production of a digital signal 224. This signal represents a electronic speaker sound and spoken commands received within the 200 Hertz to 4,000 Hertz range via the remote unit. This digital signal is then input to a subtraction circuit 225, which filters the digital signal by subtracting from it the audio mimic signal 227 to produce a residual 229.

Each of the five speaker inputs 207 from a stereo receiver or other sound source is connected to an anti-aliasing filter 231, an A/D-converter 233 and a digital signal processing chip or circuit 235 (DSP) optimized for signal processing algorithms and having sufficient internal RAM. All operation of the base unit is controlled by a control microprocessor 237, which also has a sufficiently large private memory such as an external RAM 239.

Each DSP includes firmware that causes the DSP to apply a transfer function to the associated speaker input 207 to yield a component of the audio mimic signal 227, essentially by a continuous convolution. In addition, each DSP is notified by the control microprocessor 237 of entry into a speaker learning mode, and is notified by the microprocessor when it is time to measure the corresponding audio channel to determine a transfer function. The firmware for each DSP is identical, and upon queue, causes the DSP to access received audio from a command and data bus 241, filter that received audio as appropriate, and calculate the corresponding transfer function. The transfer function is then stored in memory for the DSP.

With the transfer function for each electronic speaker learned during the speaker learning mode, and each DSP generating a component for the audio mimic signal, the control microprocessor 237 is able to perform speech recognition. Speech recognition is performed using the residual 229, by first determining whether the residual possibly represents speech and, if so, by comparing the residual against a spoken command database stored in RAM 239. This processing will be further described below. Upon detecting a match between incoming speech and characteristics of a spoken command, the control microprocessor is "pointed" to another address in RAM that stores digital information for each IR command to be transmitted, including device code(s), and these are written by the microprocessor into buffer and driver circuitry 243 for an IR transmitter 244. This buffer and driver circuitry is effective to transmit IR codes once loaded, i.e., the transmission is preferably governed by hardware. Similarly, when an IR command is received at an IR receiver 245 from the remote unit or from a remote specific to an entertainment system, buffer and driver circuitry 246 causes a microprocessor interrupt, which then interrogates that buffer and driver circuitry. If the incoming IR command reflects a mode button from the remote unit (i.e., the incoming IR command possesses the proper device code for the base unit), then the microprocessor effects the selected command or mode as soon as practical. If the incoming command includes any other device code, the microprocessor will (a) while in the command learn mode access that command and store it in RAM in association with a learned spoken command, and (b) will otherwise disregard the incoming IR command.

Lastly, the base unit 200 includes a signal generator 247 and amplifier 249 which are selectively actuated by the control microprocessor during the speaker learning mode in order to generate test signals. The amplifier 249 normally remains inactive; however, during the speaker learning mode, the signal generator is given control over the outputs 209 (as well as over optional outputs 213). The signal generator 247 utilizes a read only memory (ROM) 251 to generate appropriate test signals and drive each audio channel in turn, as a slave to the control microprocessor 237.

During normal operation, if a spoken command is recognized, the base unit 200 sends the associated IR command or commands via its IR transmitter 244 to the remote unit, which in turn sends those commands back to the target audio/video device(s) (to the appropriate entertainment systems). This is the task of remote unit's IR repeater.

IV. Learning of Spoken and Infrared Commands

A. Learning of Room (Sneaker) Configuration

Learning of speaker and room configuration is required upon initial power-up (connection of the device), when speaker parameters are not available from memory, and when the user selects a speaker learning button located on the remote unit (since speaker calibration is preferably not performed very often, this button may also be located on the base unit). The base unit's control microprocessor is master over the operation and performs two tests for each audio channel, one channel at a time. During this calibration, there should be complete silence besides the test signals.

First, the stationary case is considered. A sine wave is swept through the entire range of interest (200 Hertz–4,000 Hertz). In this first approximation, the speakers are considered a linear system, defined by a frequency response $F(j\omega)$ and a phase shift $\Phi(j\omega)$. That is, any distortion is disregarded. From the electronic speakers, audio is detected by the remote unit and arrives via radio back at the base unit following a frequency-independent time. As previously mentioned, detected audio is filtered at the remote unit using a moderately steep bandpass in the remote unit which has cut-off frequencies of 200 Hertz and 4,000 Hertz to reduce the energy needed for RF transmission. Once received by the base unit's antenna, the signal passes through another filter to avoid aliasing errors during analog-to-digital conversion. This bandpass filter again has cut-off frequencies of 200 Hertz and 4,000 Hertz, and preferably affects a very sharp cut-off. The DSP receives filtered sound from the bandpass filter and then applies a special digital filter, e.g., to distinguish harmonics from any background noise. By comparing the sine wave test signal as electronically received from the A/D converter 233 to the digitized sound signal (i.e., signal 224 from FIG. 7), the appropriate DSP can determine the complex frequency response of the transmission line.

The second measurement is performed for each audio channel to determine the delay caused by the air travel. The signal generator provides an input to the stereo receiver which in turn causes the appropriate speaker to generate a special pulse, and the delay is measured by performing a cross-correlation using the inputs 207/211 from the stereo receiver and the digitized sound signal (i.e., signal 224 from FIG. 7). This information is used in combination with the frequency response to develop a transfer function $H_n(\omega)$ which is stored in a dedicated register for the particular DSP. [Since the preferred implementation calls upon each DSP to provide time-domain convolution, the transfer function is preferably converted to a time-domain analog $H_n(t)$ and is stored in the register in that fashion.]

After performing these two measurements for each of the five channels, the base unit exits the speaker learning mode, and the stereo receiver or home theater system is instructed to switch back to stereo or home theater sound, which it passes on to the various electronic speakers. At this point, the base unit can mimic the behavior of the audio system internally.

More accurate methods of simulating the acoustics are subject of further studies. However, there has been a large amount of work in this area (See, e.g., John G. Proakis, Masoud Salehi, "Communication Systems Engineering", Prentice Hall, Englewood Cliffs, N.J. 07632, 1994, ISBN 0-13-158932-6, See Edward A. Lee, David G. Messerschmitt, "Digital Communication", Kluwer Academic Publishers, Boston, 1994, ISBN 0-7923-9391-0). Selection of suitable, alternative methods of simulating acoustics is within the skill of one familiar with electronics, and may be equivalently employed to obtain more accurate simulation, depending upon the desired application.

2. Learning Spoken Commands

During command learning, it is necessary to have complete silence in the room besides the spoken commands.

FIG. 8 illustrates the process of learning recognition of user spoken commands. Importantly, there are many different speech processing devices and algorithms which are commercially available, and FIG. 8 represents one speech processing algorithm; selection of a suitable speech processing device or algorithm is left to one skilled in electronics. It is expected that the preferred device will use a vocabulary which is on the order of a hundred words, perhaps slightly more (e.g., commands like "channel 42," "volume up," or to switch to a TV station by trade name, e.g., "ESPN"). To recognize this speech, therefore, the preferred embodiment uses a stochastic speech processing system that processes phonemes and, proceeding from one phoneme to the next, matches detected phonemes against a table of stored codes and determining whether a spoken command represents a stored code. FIG. 8 illustrates one learning process to initially enter commands, which also allows a user to overwrite old commands, using the "learn" and "end" buttons mentioned earlier.

The user presses the "learn" button to enter the command learning mode. After this button is pressed, the remote unit sends an IR signal using the base unit's device code, such that it is detected by the control microprocessor. After proceeding through the process for learning a spoken command, the user is prompted to point the remote that was pre-supplied with each desired entertainment system toward the rack unit, and the user presses the appropriate button(s). The user may combine commands for a number of devices by sequentially pointing the appropriate remotes towards the base unit and pressing the appropriate buttons on those remotes (for example, a user may combine commands which turn a tuner "on," turn a tape deck "on," switches a music source selection for the tuner to "tape deck" and also begins play for a cassette in the tape deck). Between the time that the user presses the "learn" and "end" buttons, the control microprocessor will associate any received IR commands other than mode button commands with a particular audio command. The base unit receives the IR sequence via its IR receiver, and stores the corresponding bit stream in the local RAM for the control microprocessor.

During normal operation, the speech recognition module first monitors the residual to determine whether the residual represents a possible spoken command and, if so, then proceeds to map the detected signal against a database representing the learned commands. Because speech may occur at different rates, each spoken command is preferably represented as a sequence of speech characteristics and matching of the detected signal against a known command is based on a probability analysis of whether the sequence of speech characteristics corresponds "closely enough" with a learned command. As indicated by FIG. 8, during the learning process, the user repeats a command to be learned a number of times in order to establish a data base which is then used in aid of the probability analysis. Following this learning, a user tests ability to recognize the command just spoken and the "test" data is also used to augment the existent data for the particular command. The learned pattern is stored along with the associated IR bit string in the local RAM of the control microprocessor. Preferably, this RAM has sufficient space for a predetermined number of spoken commands (e.g., 100), each having a variable number of IR commands (e.g., up to 8) which can be associated with any spoken command.

While it may seem that in practice the presence of multiple users might cause problems in recognition of a command (e.g., two different people speak the same command), for the preferred system the vocabulary is limited, and does not need to be speaker independent. The number of different users will be fairly limited in most cases, and a separate vocabulary for each user can easily be maintained. Moreover, the users can be advised to use phonetically different commands to increase recognition rates.

To this effect if, in normal operation, a spoken command can not be recognized, the user presses the "mute" button on the remote unit to force instant silence, then repeats the spoken command. If the spoken command is still not recognized, the user can be audibly prompted (e.g., via the signal generator and audio speakers) of error and requested to enter the command learning mode. Otherwise, after command execution, the firmware controlling the base unit microprocessor causes the system to return to normal operation.

B. Normal Operation

In normal operation, each of the base unit and remote unit will operate in a continuous loop; the remote unit continuously passes its filtered microphone output to the base unit by RF transmission. In addition, the remote unit repeats any received IR commands and reports any keypad commands (such as mode commands) by IR transmission to the base unit. The base unit continuously computes the audio mimic signal using measured room characteristics, and it subtracts the audio mimic signal from the filtered microphone output that it has received by RF transmission.

If a possible user command is detected, the control microprocessor's firmware causes the microprocessor to compare the residual against different known spoken commands stored in memory, until a match or a miss is determined. If a match occurs, firmware causes the control microprocessor to retrieve the digital bit string for each IR command to be issued based on the user's spoken command, and transmits the IR command(s) to the remote unit; the control microprocessor accomplishes this preferably by simply writing the digital bit string to the IR transmitter, which then modulates and transmits the commands in well-understood fashion. Because the preferred base unit is mounted together with entertainment systems, e.g., in the same wall unit, the base unit may not be within line of sight with the entertainment systems, and the remote unit "bounces back" the issued commands to the appropriate entertainment systems. Once the last command has been written to the IR transceiver for sending, the microprocessor then again resumes monitoring the residual and awaits detection of another user command.

As should be apparent from the foregoing description, the preferred embodiment enhances an entertainment experience by providing additional ease of control, and eases the burden of navigating through control menus and searching for lost remotes in a darkened room.

V. Multiple Microphone Embodiments

Figure 9:
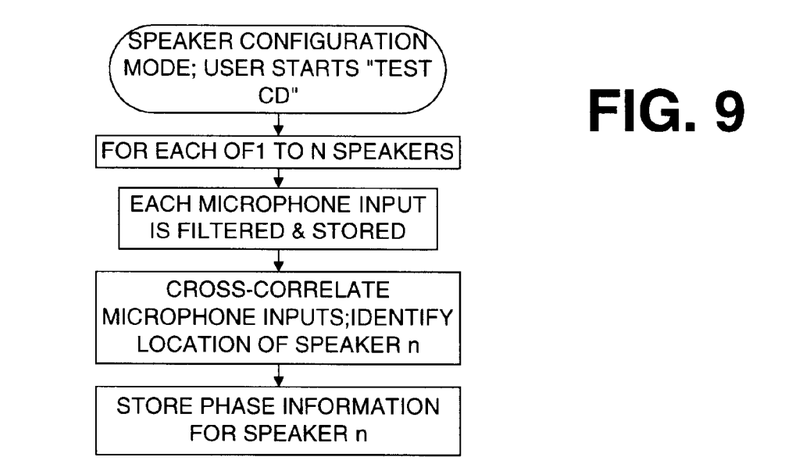
FIG. 9 is a block diagram showing use of multiple microphones in a speaker learn mode.
Figure 10:
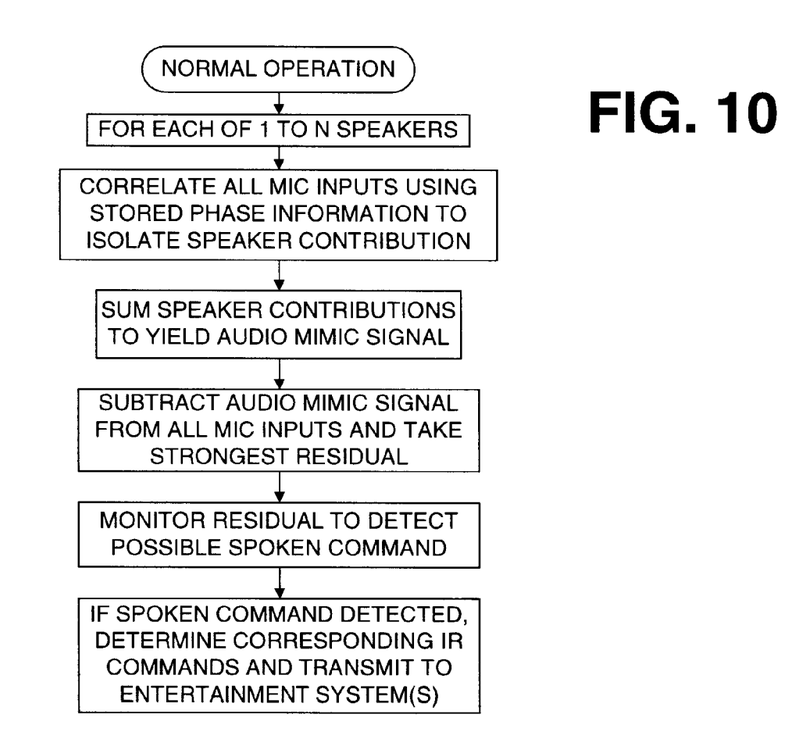
FIG. 10 is a block diagram showing use of multiple microphones in normal operation.

One contemplated alternative embodiment uses multiple microphones within the remote unit, all separated from each other by a suitable distance. This structure enables the base unit to determine the location of the speakers and the user by means of phase differences. Using this feature, the electronic circuitry of the remote unit and base unit may easily be combined into one "box," since inputs of electronic speaker signals from a stereo receiver would no longer be needed for the audio mimic signal. Otherwise stated, all of the electronics may readily be housed in the remote unit, which simply measures position of each sound source; in this embodiment, instead of a sound generator housed in a base unit, the user would play a special compact disk (CD) having an audible recognition pattern followed by test signals for each channel. The remote control uses its multiple microphones to identify each sound source and relative location; this information is represented as phase information which is stored in memory. Then, during normal operation, the remote control performs repeated cross-correlation between microphone inputs using this phase information to isolate contribution from each sound source; every electronic speaker is isolated in this manner to yield a speaker component signal, and these components are then summed and subtracted from microphone inputs to yield a residual. The residual can be based on any number of microphone inputs, or a combination of the strongest residual signals, and is subjected to speech recognition processing as has already been described. The general processing steps of this alternative embodiment are depicted in FIGS. 9 and 10, which respectively show processing functions in each of the speaker learning mode and in normal operation. When called upon to transmit IR commands, a single-unit remote control transmits the commands directly to the entertainment systems of interest.

Having thus described several exemplary implementations of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

What is claimed is:

1. A voice-operated remote control adapted for use with at least one entertainment system providing at least one electronic speaker signal corresponding to a channel of audio sound, comprising:

circuitry that receives an electronic speaker signal and generates therefrom an audio mimic signal;

a microphone that produces an output from received sound, a filtration system that uses the audio mimic signal to subtract at least one channel of audio sound from the output to thereby create a residual, a recognition processing system that monitors the residual to detect at least one spoken command and responsively associates each spoken command with at least one control command to be transmitted to an entertainment system, and a mechanism that wirelessly transmits to an entertainment system at least one control command.

2. A remote control according to claim 1, further comprising a remote unit and a base unit, wherein the remote unit houses the microphone and the base unit houses the circuitry.

3. A remote control according to claim 2, wherein:

the remote unit includes a radio transmitter;

the base unit includes a radio receiver and a microprocessor; and the remote unit transmits the output of the microphone to the base unit by radio.

4. A remote control according to claim 2, wherein:

the remote unit transmits the output of the microphone to the base unit;

said remote control further comprises a speaker learn mode that is selectively actuated to cause configuration of said remote control to generate the audio mimic signal, the speaker learn mode adapted to cause said remote control to measure a transfer function describing transfer from an electronic speaker signal to corresponding sound from the output; and the base unit generates the audio mimic signal during normal operation by applying the transfer function for an electronic speaker to the electronic speaker signal for the corresponding speaker, to thereby produce a component of the audio mimic signal.

5. A remote control according to claim 2, wherein:

the mechanism that transmits is housed in the base unit and is an infrared transmitter;

the base unit further includes a non-volatile memory adapted to store digital information representing at least one infrared command and associated modulation information for each of at least two different entertainment systems, and a learning mode adapted upon selective actuation to cause the remote unit to learn infrared commands and associated modulation information for each entertainment system and to store the infrared commands and associated modulation information in the memory;

said remote control is thereby adapted for use as a universal remote control.

6. A remote control according to claim 2, wherein the mechanism that transmits is a wireless transmitter mounted in the base unit and the remote unit includes a repeater that repeats commands transmitted from the wireless transmitter in the base unit for at least one entertainment system.

7. A remote control according to claim 2, wherein at least one entertainment system includes an infrared receiver and wherein:

the mechanism that transmits is an infrared transmitter; and the base unit further includes
a memory
a command learning mode selectively actuated to learn a spoken command and associate the learned spoken command with one or more infrared commands intended for the infrared receiver.

8. A remote control according to claim 7, further comprising machine readable instructions that cause said remote control to:

during the command learning mode, store of digital information representing multiple user repetitions of the spoken command, to thereby establish a database that will be used to detect issuance of the spoken command during normal operation, receive at least one infrared command to be associated with the spoken command and store that at least one infrared command in the memory; and during normal operation, detect of issuance of the spoken command and responsively cause transmission via the infrared transmitter each infrared command associated with the spoken command for receipt by the infrared receiver of at least one entertainment system.

9. A remote control according to claim 7, adapted for use with plural entertainment systems, each having an associated handheld remote, wherein:

said remote control further comprises a command learning mode button and an infrared receiver, the button being selectively actuated by a user to trigger entry into the command learning mode;

the command learning mode includes an infrared command learning function, the function including machine readable instructions that cause said remote control to associate an infrared command received by the infrared receiver from a handheld remote with the spoken command,
store the received infrared command in memory, and
to send the infrared command via the infrared transmitter upon detection of a corresponding spoken command.

10. A remote control according to claim 9, wherein:
the infrared transmitter of said remote control is located in the base unit;
the remote unit includes an infrared repeater; and
the remote unit echos commands issued by the infrared transmitter to thereby relay infrared commands to intended entertainment systems in response to detection of a spoken command.

11. A remote control according to claim 1, wherein at least four different audio channels are supplied to said remote control, said remote control is adapted to apply a transfer function to each audio channel to thereby produce components, and components for all at least four different audio channels are summed together to produce the audio mimic signal.

12. An improvement in an infrared remote control intended for use with one or more entertainment systems, said improvement comprising:
a sound detector that detects sound;
a memory that stores a plurality of infrared commands, each infrared command associated with at least one of a plurality of spoken commands;
a filtration module that filters audio-speaker sound from detected sound;
a recognition module that monitors filtered sound from the filtration module to detect a spoken command; and
a mechanism that transmits to an entertainment system via an infrared remote control signal at least one control command associated with a detected spoken command.

13. An improvement according to claim 12, further comprising a speaker learning mode which causes measurement of a transfer function for each electronic speaker, each transfer function describing how electronic speaker sound may be mimicked at the location of the filtration module responsive to an electronic speaker signal which drives the corresponding electronic speaker.

14. An improvement according to claim 12, further comprising:
a base unit that receives an electronic speaker signal from a plurality of electronic speakers associated with the entertainment systems and generates therefrom an audio mimic signal which mimics audio sound contributed by the plurality of electronic speakers, the base unit housing the filtration module, the recognition module and mechanism, the filtration module receiving the audio mimic signal and filtering detected sound using the audio mimic signal.

15. An improvement according to claim 14, wherein the base unit is electronically connected to the plurality of speakers to receive a speaker driver signal corresponding to each of the plurality of speakers, the base unit using the transfer functions to produce estimated sound contributed by each speaker as detected by the sound detector and coupled to the filtration module, the base unit summing estimated sound for each of the plurality of speakers together, to thereby create the audio mimic signal.

16. An improvement according to claim 12, wherein the mechanism that transmits is a wireless transmitter and each control command is transmitted as an infrared command.

17. A voice-operated remote control adapted for use with at least one entertainment system causing audio sounds, comprising:
a microphone that generates an output;
a filtration module that filters background audio from the output to yield a residual representing a spoken command;
a recognition module that monitors the residual to detect the spoken command, and that associates the spoken command with at least one infrared control command to be transmitted to a particular entertainment system; and
a mechanism that wirelessly transmits the infrared control command to the particular entertainment system.

18. A remote control according to claim 17 and adapted for use with multiple entertainment systems, wherein:
said remote control further comprises a universal device table adapted to store infrared commands including at least one command and at least one modulation code associated with each entertainment system;
the mechanism includes an infrared transmitter that transmits the control command for a particular entertainment system using command and associated modulation information corresponding to the particular entertainment system.

19. A remote control according to claim 17, wherein:
the remote control includes an input device for each one of multiple electronic speaker signals, and a summing unit that sums together information representing multiple electronic speaker signals to thereby generate an audio mimic signal; and
the filtration module is coupled to the summing unit to receive the summed information and to filter the output of the microphone using the summed information, to thereby create the residual.

20. A voice-operated remote control according to claim 1, wherein the mechanism stores in memory commands adapted to control actions of each of multiple entertainment systems and, in response to a recognized voice command, automatically transmits via wireless infrared commands associated with the recognized voice command to entertainment systems associated with those commands, the voice-operated remote control thereby adapted for use as a universal remote control for the multiple entertainment systems.

21. A voice operated remote control, comprising:

a base unit that is electronically coupled to an entertainment system to receive as inputs signals that are used to drive audio speakers for the entertainment system;

a remote unit having a microphone and a communications link for communicating with the base unit, the remote unit transmitting audio detected at the microphone to the base unit;

wherein the base unit further includes
  interference-canceling circuitry that uses the inputs to electronically filter audio from the audio speakers from detected audio,
  voice recognition circuitry for recognizing spoken commands of at least one user, and
  infrared command memory adapted to permit association of one or more infrared commands used for remote control of an entertainment system with at least one spoken command recognized by the voice recognition circuitry; and wherein the remote unit further includes a device for directing one or more infrared commands toward an entertainment system for wireless remote control thereof in response to detected spoken commands.

* * * * *